(12) United States Patent
Shah et al.

(10) Patent No.: US 10,838,930 B2
(45) Date of Patent: Nov. 17, 2020

(54) DATABASE MIGRATION SEQUENCING USING DYNAMIC OBJECT-RELATIONSHIP DIAGRAM

(71) Applicant: ACCENTURE GLOBAL SOLUTIONS LIMITED, Dublin (IE)

(72) Inventors: Vaibhav Shah, Pune (IN); Hirendra Parihar, Pune (IN); Nikhil Bhandari, Pune (IN); Aniket Jain, Kota (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 183 days.

(21) Appl. No.: 16/144,470

(22) Filed: Sep. 27, 2018

(65) Prior Publication Data
US 2019/0311041 A1 Oct. 10, 2019

(30) Foreign Application Priority Data
Apr. 5, 2018 (IN) .............................. 201811013057

(51) Int. Cl.
*G06F 16/21* (2019.01)
*G06F 16/28* (2019.01)

(52) U.S. Cl.
CPC .......... *G06F 16/214* (2019.01); *G06F 16/211* (2019.01); *G06F 16/284* (2019.01); *G06F 16/289* (2019.01)

(58) Field of Classification Search
CPC .... G06F 16/214; G06F 16/211; G06F 16/284; G06F 16/289
See application file for complete search history.

(56) References Cited

U.S. PATENT DOCUMENTS

| | | | | |
|---|---|---|---|---|
| 6,343,296 | B1* | 1/2002 | Lakhamraju | G06F 16/289 |
| 6,360,226 | B1* | 3/2002 | Kim | G06F 16/289 |
| 7,620,665 | B1* | 11/2009 | George | G06F 16/214 |
| 9,514,164 | B1* | 12/2016 | Matic | G06F 16/2365 |
| 2007/0239774 | A1* | 10/2007 | Bodily | G06F 16/214 |
| 2014/0143263 | A1* | 5/2014 | Ritter | G06F 16/215 707/756 |
| 2019/0236151 | A1* | 8/2019 | Singh | G06F 16/2365 |

FOREIGN PATENT DOCUMENTS

CA 2283050 A1 * 3/2001 ........... G06F 16/258

* cited by examiner

*Primary Examiner* — Jesse P Frumkin
(74) *Attorney, Agent, or Firm* — Mannava & Kang, P.C.

(57) ABSTRACT

A database migration system, according to an example of the present disclosure, builds a dynamic object-relationship model of a database and determines a sequence of data migration for moving data from one database to another. The system may determine a dynamic object-relationship model based on a traversal of the database schema from a root object. The system may determine object attributes for child objects in the object database. In an example, an object attribute may be a relationship between the object and another object, or a property of the object. The system may build a dynamic object-relationship model based on the determined object attributes. The system may also determine a sequence for migrating the objects in the database that does not result in missing objects or missing object attributes based on the dynamic object-relationship model.

20 Claims, 7 Drawing Sheets

Pseudo code - Schema
1. Receive database schema
2. Get root object from database schema
3. For each child object of the root object;
   a. Determine object attribute of each object
   b. From the object attribute, for each object i. Determine standard objects and non-standard objects
   c. For all the non-standard objects and standard objects
      i. Determine object attributes of the non-standard object such as attribute name
      ii. Determine label, object attribute description, object help text based on the object attribute name
      iii. Determine based on object attribute type, the object attribute such as track history, display format, default value for the attribute, whether the object attribute is a must fill filed, reference information, label, relationship and delete constraints, master read, external ID, unique object, precision, scale, length of attribute, encryption, character mask, type of mask, case sensitive values and the like
      iv. Based on the determined object attribute information in iii determine an object attribute for migration for that object.

FIGURE 3

Pseudo code – Sequence

Example 1: determine dynamic object-relationship model for migration between databases of same type 1. Determine Objects in the Database Schema
2. For each of the object in the Database Schema
   a. Get details about the object using sObject interface
   b. Get the information of all attributes (fields/columns) for that object.
   c. For each attribute present in the object
      • Get data type of attribute;
      • When datatype of attribute is Reference && editable/creatable && related to the same table
         Classify attribute as Self-Related;
      When datatype of attribute is Reference && editable/creatable && attribute is a foreign key
         Classify attribute as Direct-Cross-Related
      When datatype of attribute is Reference && not-editable/not-creatable (iterate for each object attribute in database until all object attributes are processed)
         Determine whether the object has a child object
            If yes, classify attribute as Indirect-Cross-Related;
            If no, classify attribute as parent-child relationship;
3. Continue the above process till all the 'Indirect Cross Related' is found (about 9-10 level and repetitions in general)
4. Continue iteratively
   a. While an object in the database is processed
      • Determine Sequence of Objects based on the Parent-Child Relationship identified in step 2, by prioritizing the parent-objects for migration,
      • Then prioritize siblings of child objects with parent object that are identified for migration.

Example 2: determine dynamic object-relationship model for migration between different types of databases
1. Run the script to generate XML;
2. Search XML to determine objects and object attributes. For example, using the '<CaseHirerachy>' tag in the string and/or sub-strings present between '<CaseHirerachy >' and '</CaseHirerachy >' tag.
3. For each object in the database schema identify data; and
4. Save data in a comma separated file, Excel™ file or the like for further processing.
   • Capture that sub string (data) and go on adding it to prepare the final excel file.

FIGURE 4

DATABASE MIGRATION SEQUENCING USING DYNAMIC OBJECT-RELATIONSHIP DIAGRAM

PRIORITY

This application is a Non-Provisional application that claims priority to Indian Provisional Patent Application number 201811013057, filed on Apr. 5, 2018, the disclosure of which is hereby incorporated by reference in its entirety.

BACKGROUND

Databases may be used to store structured data. Traditionally, the design of a database is tailored to the scope and purpose of an application. When the application functionality changes, the design of the database is often changed from the original design to accommodate the new functionality. For example, new entities may be introduced, new relationships between entities defined, additional fields may be added and the like. In an example, relationships expressed in the database between fields may include custom attributes that are not standard functionality. For example, these may be customizations to the database or the application. These customizations result in the database schema of a standard database present during a fresh installation differing from the database schema of the customized database. Therefore, migrating data from the database designed for the application to another database using the original database design or database schema may result in the migrated data losing its integrity. For example, the customized attributes may not be migrated or there may be missing data in the database after migration when these customized attributes are not migrated.

BRIEF DESCRIPTION OF THE DRAWINGS

Features of the present disclosure are illustrated by way of example and not limited in the following figure(s), in which like numerals indicate like elements, in which:

FIG. 3 shows an example of pseudo-code for determining the object attributes of each of the child objects in a database schema for migration, according to an example of the present disclosure;

FIG. 4 shows an example of pseudo-code for determining the dynamic object-relationship model and the object sequence for migration, according to an example of the present disclosure;

DETAILED DESCRIPTION

Figure 1:
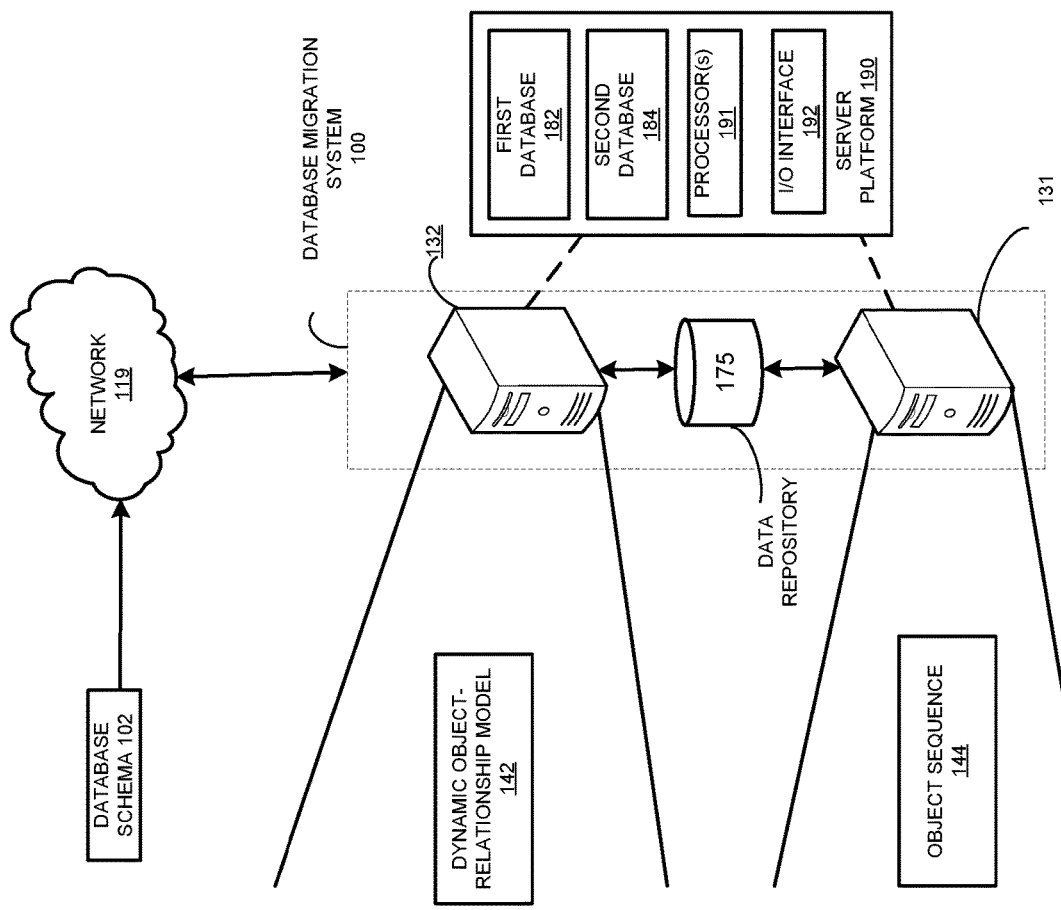
FIG. 1 shows a system diagram of a database migration system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "an" and "an" are intended to denote at least one of a particular element, the term "includes" means includes but not limited to, the term "including" means including but not limited to, and the term "based on" means based at least in part on.

A database migration system, according to an example of the present disclosure, builds a dynamic object-relationship model of a database and determines an object sequence for moving objects from one database to another. In an example, the system may determine a dynamic object-relationship model based on a traversal of the database schema from a root object. For example, the system may determine a child object in the database schema related to the root object. In an example, an object in the database may refer to a database structure for storing information that relates to a definable thing such as a person, entity and/or concept. For example, a customer may be an object. The system may determine object attributes. In an example, an object attribute may be a relationship between the object and another object, or a property of the object. For example, a root object may be a table with one or more columns; each column may indicate an object attribute of the root object. In another example, the object attribute may be a foreign key that relates the root object to another object (e.g., a table). The system may thus build a dynamic object-relationship model. The system may also determine a sequence for migrating the objects in the database that does not result in missing objects or missing object attributes based on the dynamic object-relationship model.

In an example, to determine the sequence for migrating the objects and the object attributes from a database to another database, the system may determine a list of objects in the database. The system may then determine the object attributes of each object in the list of objects using an application programming interface (API) to the database. For example, the system may use an sObject interface provided for a particular type of database to retrieve information about the objects in the database. In an example, the object attributes may include information about the fields (e.g., columns) for the object (e.g., table). The system may classify the relationships into self-related, direct cross-related, indirect cross-related and/or parent-child-related objects. In an example, a cross-related object may be an object that has a one to many relationships with multiple other objects in the database. For example, a first object may be related to many other objects. In an example, a self-related object may have the same content as its parent object. In an example, a self-related object may have a field/column with the same content as its parent's object or table. In an example, an object attribute may express a relationship between the object and another object in the database. For example, an order may be related to a customer. The customer object may include a foreign key to the order as one of its object attributes. In an example, the object attribute may relate to the same object, i.e., is self-related. For example, the customer object may have a first name attribute and a second name attribute.

The system may identify a non-editable or non-creatable object attribute of each object in the database. An attribute may be non-editable when the attribute refers to data that is outside of the object. For example, the attribute may be non-editable if the attribute refers to data in a parent object or in a foreign key. The attribute may be non-creatable because the data for the attribute is to be created in another object, which will result in an exception if that attribute is created. While moving the object, from a first database to a second database a non-creatable object attribute will result in incorrect attribute information in the second database if the attribute refers to data in another object.

The system may then determine whether the non-editable or non-creatable object attribute is a foreign key of another object. In response to a determination that the non-editable or non-creatable object attribute is not a foreign key, the system may classify the object attribute as a parent-child relationship. In an example, a non-creatable attribute may be one where the object data depends on the data of other objects or object attributes of another object. For example, an object attribute may be a formula or an attribute of a parent object such as a parent data field. A non-creatable attribute may refer to an attribute whose value is dependent on the value of another attribute or may be calculated at runtime using a formula. In an example, a parent object may be an object that is present at a hierarchical level above the child object and closer to the root. The child object may be an object present below the parent object. An example, of a parent-child related object may be an Accounts object and a contact person object, where the Accounts object is the parent and the contact person object is a child of the Accounts object.

In an example, the system may classify the object attribute as self-related when the data type of the attribute is determined to be a reference to another object and is editable or creatable. An example of a reference to another object is a reference to the data or content of the parent object. In another example, the system may classify the object as direct cross-related when the data type of the attribute is determined to be a reference and is editable or creatable. A creatable attribute is one which does not depend on data from another attribute or from a parent object's attribute such as field of the parent object. A creatable object may have data explicitly specified as opposed to being calculated at runtime or depending on another attribute. In an example, an object may be a direct cross-related object when the object referenced is present within the same table, e.g., a field within the same database table may be a direct cross-related object. The system may then determine the sequence of migrating each object in the database by prioritizing the parents in the identified parent-child relationship followed by the siblings of the child object in the identified parent-child relationship. In an example, the system may also determine the object sequence based on the four classifications of the object attribute determined above.

In an example, to determine the classification of object attributes of objects as discussed above, the system may use an iterative process for object attributes of the objects. For example, the system may initially classify non-editable or non-creatable attributes as a parent-child relationship. The system may then determine whether the non-editable attribute is a foreign key of another object. Based on a determination that the non-editable attribute is a foreign key of another object, the system may then reclassify the non-editable attribute as an indirect cross-related attribute. The system may perform this reclassification for all attributes in the original object. The system may then iteratively perform these actions on the child objects identified above until all the attributes in the database are processed to identify all the parent-child relationships and/or the object attributes are classified into one of the four types. In an example, the system may classify an object attribute as self-related when the data type of the attribute is determined to be a reference and is editable or creatable. In another example, the system may classify the object as direct cross-related when the data type of the attribute is determined to be a reference and is editable or creatable. The system may then as described above determine the sequence of migrating all objects in the database schema to prioritize the parents in the identified parent-child relationship followed by the siblings of the child object in the identified parent-child relationship. In an example, the system may also determine the object sequence based on the four classifications of the object attribute determined above.

In an example, the database and the objects in the database may be on a cloud service, and the system may determine the object sequence for migrating objects on the cloud service to another database. Also, the system may be a cloud service for determining the dynamic object-relationship model and the object sequence for migrating objects in the cloud service to another database. For example, the system may migrate objects from one cloud service to another cloud service. In another example, the system may migrate objects from one cloud service to a database on a server.

The examples of the present disclosure are generally related to building a dynamic object-relationship model of a database and determining a sequence of data migration for moving data from one database to another. Historically object-relationship model of a database and moving objects and object attributes in a database to another database is based on the original schema of the database. A technical problem associated with building an object-relationship model based on original database schema is that database schema custom objects may be created during the operation of the database. Thus, the object-relationship model be inaccurate. The inaccurate object-relationship model may result in incomplete objects and/or object attributes once moved. Also, the process may have to be restarted after the error in the object-relationship model is manually identified. The system according to examples herein may determine a dynamic object-relationship model based on the current objects and the object attributes in the current database. The system may then determine the sequence of moving the objects, and the object attributes from one database to another based on the dynamic object-relationship diagram.

Another technical problem associated with the object-relationship model is that object attributes may be of different object types. Therefore, determining the dynamic object-relationship model is difficult. For example, the object attribute (e.g., a column in a table) may refer to a foreign key of another table, a self-attribute, direct cross relationship or a parent-child relationship. Thus, determining the dynamic object-relationship model is challenging.

The system according to examples herein may determine the dynamic object-relationship model based on an iterative algorithm as described herein. Thus, the system may improve the field of dynamic object-relationship modeling and/or object sequencing for migration of databases by allowing computers to determine the dynamic object-relationship model. Also, the dynamic object-relationship model does not require trial and error to determine the object sequence for migrating the objects in the database. For example, when the parent-child relationships are misidentified in the database, the migration has to be restarted. For a database that could include objects storing millions of records, the computing resources such as CPU utilization, power utilization and the like are significant when migration is restarted or trial and error methods are utilized.

With reference to FIG. 1, there is shown a system diagram of a database migration system 100, hereinafter system 100 according to an example of the present disclosure. The system 100 is referred to as a database migration system because it may determine and use a dynamic object-relationship model and determine an object migration sequence that preserves objects and object arguments during migration of the database. The system 100 may generate the dynamic object-relationship model based on a parsing of the database schema.

The system 100 may receive a database schema 102 for a first database 182 that is to be migrated to a second database 184. In an example, the database schema 102 may be an XML file. For example, the customer relationship management software database schema may be generated in the form of an XML using a script. Examples of the first database and second database 184 may include databases used in customer relationship management applications or other applications. In another example, the databases may belong to different applications. The database schema 102 may be stored in the data repository 175. The database schema 102 may be received via network.

Three examples of cloud-based databases that may be used for either of databases 182 and 184 are now described. In an example, one or more of the databases 182 and 184 may be a customer relationship management (CRM) cloud database where one to many and many to one relationships can be established between objects in tables. There may be no direct many to many relationships between two tables. In another example, one or more of the databases 182 and 184 may include an on-cloud and on-premise CRM database which represents the data in an application in the form of Data Types (class that holds data), Data Pages (format and visual representation) and properties (content of data) which relate to each other to provide real-time analysis and decision-making. In yet another example, one or more of the databases 182 and 184 may include a cloud CRM database where one to many, many to one and many to many relationships can be established. Entities and their tables can be derived from meta data tables and relationships can be derived through other sub tables in meta data and repository tables.

The system 100 may determine a root object from the database schema 102. In an example, the root object may be a table with columns and rows. In an example, the columns of the table may represent object attributes of the root object. In an example, the system 100 may determine child objects of the root object based on an object attribute. The system 100 may then determine for each child object below the root object, object attributes of each child object. The system 100 may then determine standard objects and nonstandard objects for the first database 182. For example, assume the first database 182 is a CRM database where one to many and many to one relationships between objects can be established. The first database 182 may include certain standard objects that may be present in all installations. In an example, the standard objects may be determined by initializing a fresh installation of the first database 182. However, the current production database may include customizations such as custom objects and object attribute additions to the standard objects. The system 100 may then determine the nonstandard objects. The system 100 may then determine the object attributes of the nonstandard objects identified in the database schema 102. Also, the system 100 may determine the object attributes (e.g., columns) added to the standard objects (e.g., tables) in the database schema 102.

Examples of object attributes may include the object attribute name, object attribute description, object attribute help text, type of object attribute and the like. FIG. 3 below shows a pseudo-code for determining the object attributes of child objects in the database schema 102. The system 100 may iterate over all the child objects in the database schema 102 to identify the object attributes for all the objects.

The system 100 may then determine the dynamic object-relationship model 142. The system 100 may identify a non-editable or non-creatable object attribute of each object in the database. For example, the system 100 may use the metadata from the schema 102 to identify whether an object attribute is non-editable or non-creatable. In an example, the system 100 may use the API for the database to determine whether an object is creatable or editable. The API may indicate whether an object is creatable or editable. The system 100 may then determine whether the non-editable or non-creatable object attribute is a foreign key of another object. In response to a determination that the non-editable or non-creatable object attribute is not a foreign key, the system 100 may classify the object attribute as a parent-child relationship. In an example, the system 100 may classify object attribute as self-related when the data type of the attribute is determined to be a reference and is editable or creatable. In another example, the system 100 may classify the object as direct cross-related when the data type of the attribute is determined to be a reference and is editable or creatable. The system 100 may then determine the sequence of migrating all objects in the database schema 102 by prioritizing the parents in the identified parent-child relationship followed by the siblings of the child object in the identified parent-child relationship. In an example, the system may also determine the object sequence based on the four classifications of the object attribute determined above.

In an example, to determine the classification of object attributes of objects as discussed above, the system 100 may use an iterative process for object attributes of the objects. For example, the system 100 may initially classify non-editable or non-creatable attributes as a parent-child relationship. The system 100 may then determine whether the non-editable attribute is a foreign key of another object. Based on a determination that the non-editable attribute is a foreign key of another object the system 100 may then reclassify the non-editable attribute as an indirect cross-related attribute. The system 100 may perform this reclassification for all attributes in the original object. The system 100 may then iteratively perform these actions on the child objects identified above until all the attributes in the database are processed to identify all the parent-child relationships and/or the object attributes are classified into one of the four types, e.g., self-related, direct cross-related, indirect cross-related and/or parent-child-related objects. FIG. 4 below shows an exemplary pseudo-code for determining the dynamic object-relationship model 142 of child objects in the database schema 102.

The system 100 may then as described above determine the object sequence 144 for migrating the objects to prioritize the parents in the identified parent-child relationship followed by the siblings of the child object in the identified parent-child relationship. In an example, the system 100 may use the four types of relationships to determine the object sequence 144. The system 100 may then perform the migration of the objects from the first database 182 to the second database 184 based on the object sequence 144.

In an example, the database and the objects in the database may be on a cloud service, and the system 100 may determine the object sequence for migrating objects on the cloud service to another database. Also, the system 100 may be a cloud service for determining the dynamic object-relationship model 142 and the object sequence 144 for migrating objects in the cloud service to another database. For example, the system 100 may migrate objects from one cloud service to another cloud service. In another example, the system 100 may migrate objects from one cloud service to a database on a server.

The network 119 may include local area networks and wide area networks, such as the Internet. The network 119 may include signal-bearing mediums that may be controlled by software, applications and/or logic. The network 119 may include a combination of network elements to support data communication services. The network 119 may encompass wired and/or wireless network technologies.

In an example, the system 100 may include one or more of processor 191, with an I/O interface 192 running on a server platform 190. The server platform 190 may include one or more servers shown as 131, 132. The servers may include machine readable instructions stored in a memory on the servers 131, 132 to execute one or more machine readable instructions to perform one or more operations as set forth in examples below.

Examples of operations performed by the server platform 190 are shown at 132 and 134. For example, the server may determine a model such as the dynamic object-relationship model based on the database schema 102.

The server platform 190 is an example of hardware that may be used in the system 100. It should be understood that the server platform 190 may include additional components and that one or more of the components described herein may be removed and/or modified as is known to one of ordinary skill in the art.

The server platform 190 may include one or more processors 191, data storage, and an input/output (I/O) interface 192. The components of the server platform 190 are shown on a single computer or server as an example, and in other examples, the components may exist on multiple computers or servers. The server platform 190 may store data in the data storage and/or may manage the storage of data stored on a separate computing device, for instance, through the I/O interface 192. The data storage may include physical memory, a hard drive, an optical drive, a flash drive, an array of drives, or any combinations thereof, and may include volatile and/or non-volatile data storage.

The processor 191, which may comprise a microprocessor, a microcontroller, an application-specific integrated circuit, Graphical Processing Unit or the like, is to perform various processing functions of the respective server. However, the functions and operations of these servers may be performed on a single server or multiple servers which may be connected via a network.

The I/O interface 192 includes hardware and/or a software interface. The I/O interface 192 may be a network interface connected to a network through a network device, such as a router. For example, the I/O interface 192 may be a wireless local area network (WLAN) or a network interface controller (NIC). The WLAN may link to the network device through a radio signal. Similarly, the NIC may link to a network device through a physical connection, such as a cable.

The data repository 175 may include a database comprised of database tables or another type of data storage system. The data repository 175 can be implemented as a standalone or distributed repository.

Figure 2:
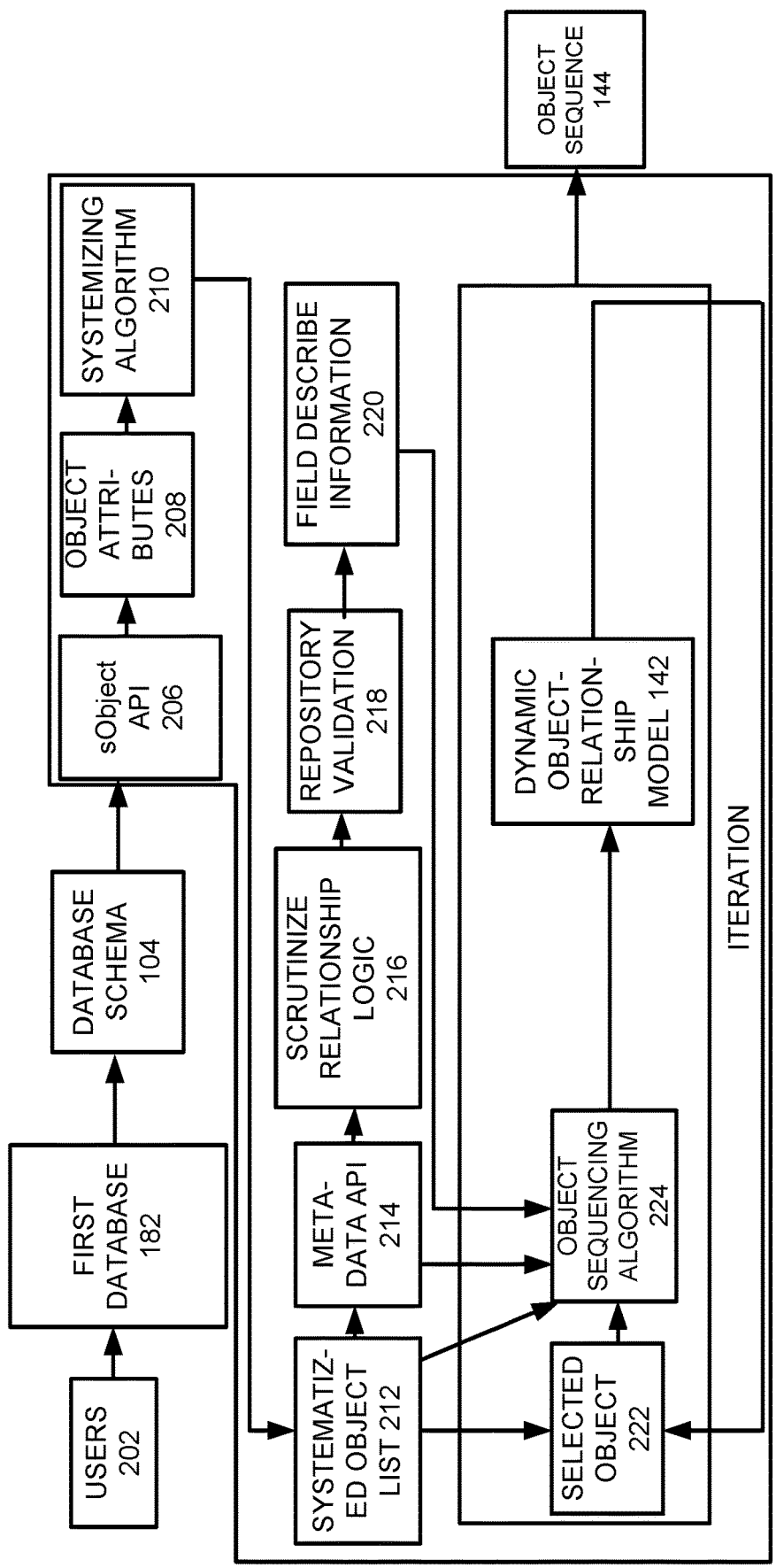
FIG. 2 shows an example of a flow diagram for generating a dynamic object-relationship model, according to an example of the present disclosure.

FIG. 2 shows an example of a flow diagram for generating a dynamic object-relationship model and an object sequence 144 for determining the order for migration of objects and their object attributes in the database. The system 100 may use authorized access for users 202 for the first database 182 that is to be migrated to obtain the database schema 102. In an example, the system 100 may run scripts to obtain the database schema 102 in a particular form, e.g., an XML format. In an example the first database 182 and a second database 184 to which the objects are to be migrated may be the same database management application. In another example, the first database 182 and the second database 184 may be databases which are used by different database management applications. For example, the first database 182 may be used by a first type of CRM application, and the second database 184 may be used by another type of CRM application.

The system 100 may determine the root object in the received database schema 102. For example, the system 100 may use the metadata information from the database schema 102 to determine the root object. For example, a root object may be a parent object with no other parent objects. In an example, the system 100 may compare the database schema 102 of the production database to a newly initialized database to determine custom objects and standard objects in the database schema 102. In an example, a production database may refer to a database used in a live environment. In an example, the standard objects may be modified with object attributes (e.g., a new column).

In an example, sObject describe API 206 may provide the attributes of the object. For example, for one type of CRM database, the standard sObject API may provide information about the tables and attributes of the tables, objects present in the first database 182. For example, the object attributes may include information such as relationships between objects, the relationship of objects, the self-relationship between a column and the object and the like. The system 100 may determine an object attributes (e.g., raw metadata) 208 for each object in the database schema 102. For system 100 may use a systematizing algorithm 210 to determine a systematized object list 212. In an example, the systematized object list 212 may include all objects in the database schema 102. In an example, the systematized object list 212 may include out of the box objects that are installed as part of an application installation. The systemized object list 212 may also include customized objects that are present in the first database 182.

In an example, the system 100 may determine for each customized object present in the first database 182 in the systemized object list 212, metadata using the metadata API 214.

For example, the system 100 may select a child object of the parent object (e.g., selected object 222). The selected object list 212 may be passed through an object sequencing algorithm 224 along with inputs from the metadata API 214 to determine the relationship expressed in an object attribute of the selected object 222. The relationship expressed in the selected object 222 may be determined from the field information (e.g., a column of the table) and the metadata associated with the fields of the selected object 222. For example, if the field information is an immutable field or a non-creatable field, the system 100 may then determine whether the object attribute describes a parent-child relationship. To determine the parent-child related object, the system 100 may determine whether the object attribute is a reference to another object in a different table or a reference to another object in the same table. The system 100 may then classify the object as either an indirect cross-related or a parent-child related object.

The system 100 may, for example, use the scrutinize relationship logic 216, repository validation 218 and field describe information 220 to determine the relationship of the child objects to the parent object. For example, as described above the system 100 may classify the objects into a parent-child relationship amongst other relationships.

The system 100 may determine the field information is a mutable field or creatable field. The system 100 may then determine whether the object attribute references the child object, i.e., references itself. Based on a determination that the child object references itself the system 100 may then classify the child object as a self-related object. In another example, the system 100 may be based on the determination that the object does not reference itself, determine the object is a direct cross-related object.

The system 100 may then determine the object sequence 144 for migration by prioritizing the parent objects before the child objects. In an example, self-related object migration may require additional steps to ensure the child object attributes are accurately reflected when an object is migrated from the first database 182 to the second database 184. In an example, system 100 may determine the object sequence 144 to prevent missing objects in the second database 184 and/or to preserve the attributes of the objects in the second database 184 such that they are consistent with the attributes of the objects in the first database 182.

In an example, the object sequencing algorithm 224 may provide a dynamic object-relationship model 142 of a different object that may need to be migrated and the object sequence 144 in which to migrate the objects to keep the object attributes the same between the first database 182 and the second database 184. For example, the object attributes may refer to the relationships between the objects such as customer and account. In an example, the objects in the same level or siblings of the same parent object can be migrated in parallel to minimize the time taken as compare to when you migrate them one by one.

In an example, two objects in the database schema 102 may be e related to each other as parents of each other. The system 100 may identify such relationships in the dynamic object-relationship model. The system 100 may also identify the self-related and cross-related relationships along with the parent and child relationships. In an example, the system 100 may use these relationships to determine the object sequence 144 for migration from the first database 182 to the second database 184.

In another example, the system 100 may determine a scheme for delta migration. For example, when the database schema 102 includes millions of objects and the time for migration is very short, the migration may be carried out in phases. The object sequence 144 and the dynamic object-relationship model 142 may allow for delta migration of the data from the first database object to the second database 184. In an example, the system 100 may use the object sequence 144 to identify the changes to objects that were migrated from the first database 182 to the second database 184 in the first database 182 after say the second phase of two phases. The first database objects that have changed may then be synced with the second database 184 at the end of the migration.

FIG. 3 shows an example of a pseudo-code for determining the object attributes of child objects in a database schema 102. For example, the system 100 may determine the root object from the database schema 102. The system 100 may then determine child objects based on a foreign key that can be edited or that cannot be created. The system 100 may determine for each child object in the database scheme 104 standard objects and nonstandard objects for the first database 182. The system 100 may then determine the attributes of the nonstandard objects. For example, the system 100 may determine the attributes of the nonstandard objects. In another example, the system 100 may determine the object attributes added to the standard objects in the database schema 102 to generate custom objects.

As shown in FIG. 3, the system 100 may determine the attributes for each custom object such as the label from the name, field description, help text for the field, type of field and the like. Based on the type of field, the system 100 may then determine object attributes such as the track history, display format, default attribute value, required object attribute, reference attribute, reference attribute label, attribute name, attribute delete constraints, external ID, unique key attribute, currency attribute, encrypted or masked attribute and the like. The system 100 may then generate an attribute for the object based on the object attributes.

FIG. 4 shows an example of pseudo-code for determining the dynamic object-relationship model 142 of child object in the database schema 102. In the first example, the first and second databases 182 and 184 may be for the same application, such as the same CRM database application having where one to many and many to one relationships can be established between tables. The system 100 may identify a non-editable or non-creatable object attribute of each object in the database. In an example, a non-editable or non-creatable object attribute of each object in the database may denote a parent-child related object. However, the child table is the same as the parent table the relationship may be an indirect cross-related list. The system 100 may iterate through each child object to determine the objects with the parent-child related object in the database schema 102. The system 100 may then iterate until all child objects in the system 100 have been analyzed. The system 100 may then determine the object sequence 144 by prioritizing the parent objects before the child objects. The system 100 may thus migrate the database from the first database 182 to the second database 184 based on the object sequence 144.

The system 100 may also generate a database schema in the form of an XML file with the database schema 102 for the customer relationship management application as shown in the second example in FIG. 4. In the second example, database 182 may be a first type of CRM database that represents data in an application in the form of Data Types (class that holds data), data pages (format and visual representation) and properties (Content of data), and the database 184 may be a second type of CRM database where one to many and many to one relationships can be established. For example, the system 100 may run a script if the first database 182 is a database in a customer relationship management application that supports the script. The system 100 may determine the string for each of the tags found in the database schema 102 (e.g., XML file). The system 100 may then capture attributes (e.g., sub-strings) as shown in FIG. 4. The system 100 may then generate a dynamic object-relationship model 142 (e.g., spreadsheet file) as shown in FIG. 4.

Figure 5:
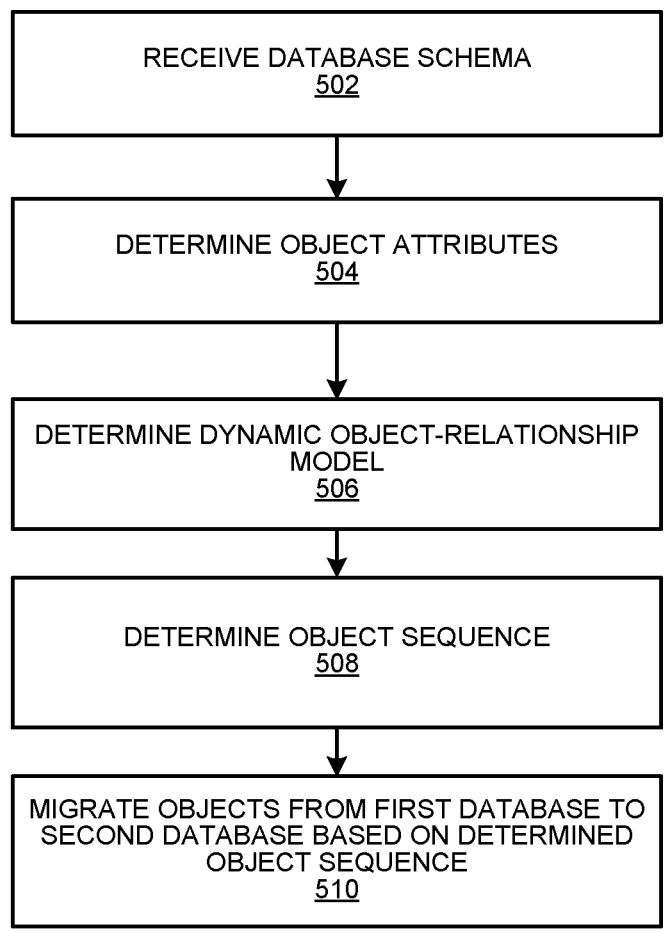
FIG. 5 shows a method for database migration using the dynamic object-relationship model and the object sequence, according to an example of the present disclosure.

FIG. 5 shows an example of a method 500. The method 500 may be performed by the system 100 or another system to perform database migration using the dynamic object-relationship model 142. The method 500 is described by way of example as being performed by the system 100 and may be performed by other systems. The method 500 and other methods described herein may be performed by one or more servers or other types of computers including at least one processor executing machine readable instructions embodying the methods. Also, one or more of the steps of the method 500 and steps of other methods described herein may be performed in a different order than shown or substantially simultaneously.

At 502, the system 100 may receive the database schema 102 for the first database 182 to be migrated to the second database 184. The database schema 102 may as described with reference to FIG. 1 may be generated using a script file. In another example, the system 100 may receive the database schema 102 from a user.

At 504, the system 100 may determine database object attributes. For example, the system 100 may determine the object attributes starting from the root object. For example, the root object may be a table. The columns of the root object may be attributes of the root object and may refer to a child object or another parent object or the like. The system 100 may determine the attributes of each of the child objects as discussed above with reference to FIG. 3. For example, the system may determine the standard objects and the nonstandard objects in the database schema 102. The system 100 may then determine additional metadata or attribute information about each of the child objects. For example, each column in each of the child object table may represent an object attribute. The system 100 may thus determine the objects in the database schema 102 and the object attribute (e.g., relationship) of the objects in the database schema 102.

At 506, the system 100 may determine the dynamic object-relationship model 142. For example, as described above with reference to FIG. 1 and FIG. 4, the system 100 may determine whether the non-editable or non-creatable object attribute is a foreign key of another object. The system 100 may in response to the determination that the object attribute is non-editable or non-creatable and is not a foreign key, classify the object attribute as a parent-child relationship.

At 508, the system 100 may determine the object sequence 144 for migrating the objects. For example, the system 100 may prioritize the parent objects in the parent-child relationship determined in the previous step. The system 100 may then prioritize the siblings of the child objects, i.e., objects with the same parent. In an example, the system 100 may determine that the objects that are siblings may be moved together. The system 100 may then prioritize additional child objects located below the child object of the root object and so on until all child objects in the database schema 102, are prioritized to generate the object sequence 144.

In an example, the system 100 may determine the object sequence 144 for migration based on the relationships in the dynamic object-relationship model 142. For example, the dynamic object-relationship model is based on the classification of objects in the database into self-related, direct cross-related, indirect cross-related and/or parent-child-related objects. The system 100 may, for example, migrate the objects with a parent-child relationship by migrating the parent first before the child object is migrated. Subsequently, the direct cross-related objects may be moved because these represent object attributes in the same table. Then the indirect-cross related objects may be migrated after the object containing the cross-relationship is created. The self-related objects may be migrated with an additional step necessary to populate the child object with the data from the parent object. The system 100 may use this classification to determine the object sequence 144 that prevents missing objects or missing object attributes in the second database during migration. For example, trying to moving a cross-related object before the other object referenced by a first object is created may result in the object attribute not being created or misdirected for the cross-related object in the first object.

In an example, the object sequence 508 may account for the master-detail attribute. For example, the system 100 may determine the serial list of objects to prevent locking by preventing the objects or object attributes from being moved parallelly for master-detail attributes in the database schema 102. The system 100 may thus, determine an object sequence 144 for migration of the database from the first database 182 to the second database 184.

At 510, the system 100 may migrate the objects from the first database 182 to the second database 184 based on the object sequence 144. In an example, the system 100 may create new objects in the second database 184 based on the object sequence 144. For example, the root object may be created in the second database 184 and populated with the attributes of the root object, then a child object related to the root object may be created and populated in the second database 184. In an example, the system 100 may migrate the objects from the first database 182 to the second database 184 in a delta configuration. For example, a part of the database may be moved from the production database and progressively the migration may be performed in increments. The system 100 may then determine the objects that were migrated in one of the delta configurations in the first database 182. The system 100 may then sync the objects by deleting the objects or modifying the objects in the second database 184 to ensure the objects in the first database are completely migrated to the second database. In another example, the unused objects in the first database 182 may be deleted in the move to the second database object.

Figure 6:
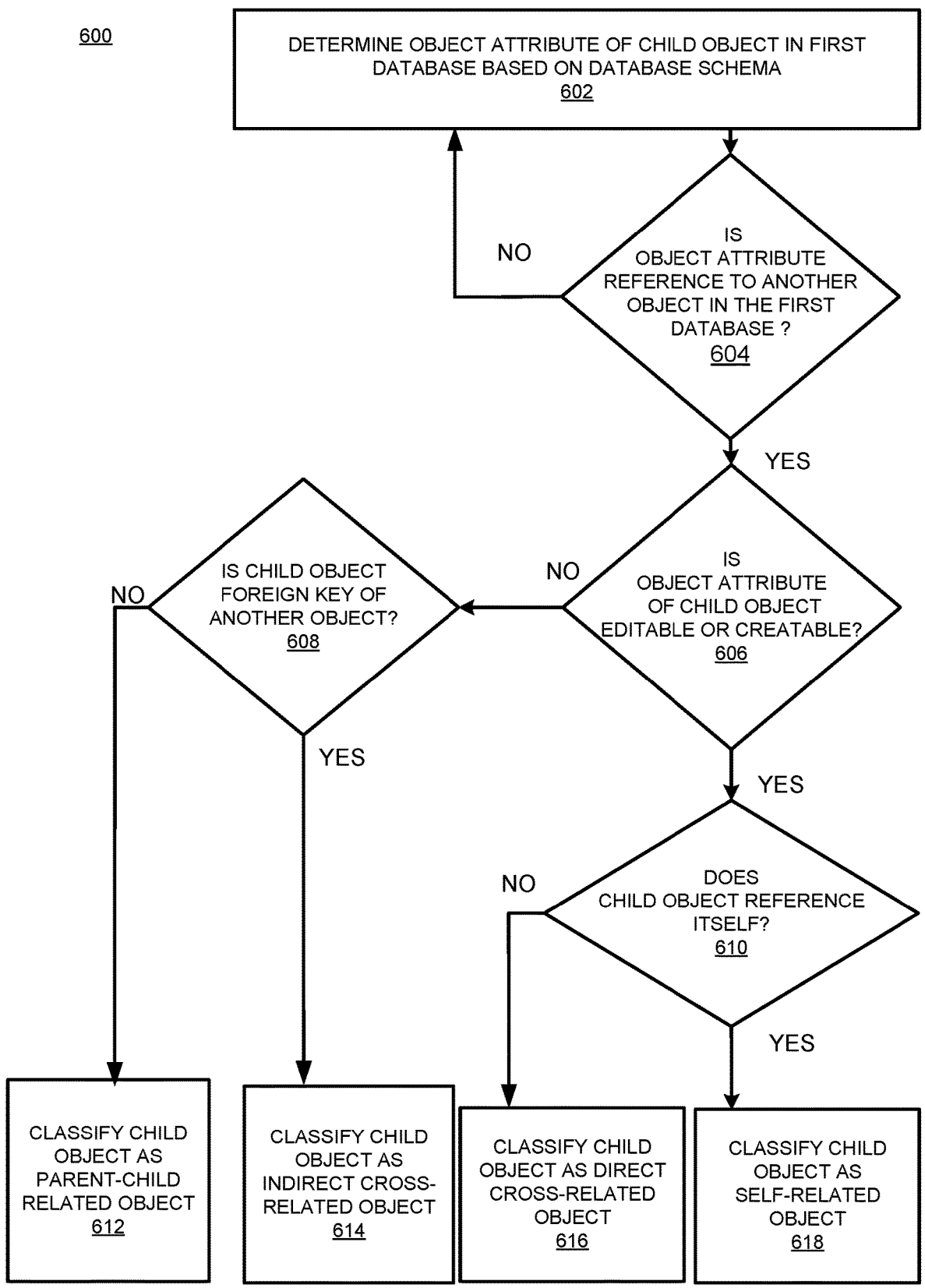
FIG. 6 shows a method for classifying an object into one of four relationships, according to an example of the present disclosure.

FIG. 6 shows an example of a method 600 for classifying an object into one of four relationships based on an attribute of a child object.

At 602, the system 100 may determine the object attribute of the child object in the first database 182 based on the database schema. In an example, the database schema 102 may state the object attributes of the objects in the first database 182, such as columns or fields of the database. In another example, the system 100 may receive the database schema 102 from a user. In an example, the system 100 may select the child object from the root object. A root object may be the object that is linked to all objects in the first database 182 and is at the top of the hierarchy of objects in the first database 182. A child object is an object in the hierarchy that is connected to the root object. In an example, the system 100 may determine the attribute of the object using a systemizing algorithm which determines the relationship between the objects. In an example, a systemizing algorithm may determine the object attributes by examining the metadata of the object such as the columns and fields to determine the object attributes and the relationships expressed in object attributes that link the object to other objects in the database.

The system 100 may determine database object attributes starting from the root object or the child object of the root object. For example, the system 100 may determine the object attributes of the child object starting from the root object. For example, the root object may be a table. The columns of the root object may be attributes of the root object, refer to a child object or another parent object or the like. The system 100 may determine the attributes of each of the child objects as discussed above with reference to FIG. 3.

At 604, the system 100 may determine whether the object attribute is a reference to another object in the first database 182. In an example, the system 100 may determine whether the object attribute is a reference based on a systematization algorithm. In an example, a reference may point to another object such as a foreign key, to its parent or another object in the same table or another object in another table. When the object attribute is a reference, the object attribute may then be used as described in the steps below to classify the objects into self-related, direct cross-related, indirect cross-related and/or parent-child-related objects. The system 100 may branch to 602 to determine another object attribute if the object attribute is not a reference to another object.

At 606, the system 100 may determine whether the object attribute of the child object is editable or creatable. Object attributes that are not editable or creatable may indicate an object is a reference object. Reference objects may be indirect cross-related objects or direct cross-related objects. Indirect cross-related objects may point to an object in a different table than the current table. A direct cross-related object may reference an object in the current table. The system 100 may branch to step 606 or step 608 based on the determination that the child object is editable or creatable.

At 608, the system 100 may determine whether the child object is a foreign key of another object. In an example, the system 100 may determine whether the child object has the same content as the content in another table in the first database 182. The system 100 may branch to step 612 or step 614 based on the determination.

At 612, based on the determination that the child object is not a foreign key of another object, the system 100 may classify the child object as a parent-child related object.

At 614, based on the determination that the child object is a foreign key of another object, the system 100 may classify the child object as an indirect cross-related object.

At 610, the system 100 may determine whether the child object references itself. In an example, the child object may reference itself when the content of the child object is the same as the content of its parent. The system 100 may branch to step 616 or step 618 based on the determination.

At 616, based on the determination that the child object does not reference itself, the system 100 may classify the child object as a direct cross-related object.

At 618, based on the determination that the child object references itself, the system 100 may classify the child object as a self-related object.

In an example, the system 100 to generate a dynamic object-relationship model for each object in the first database starting from a root object, wherein to generate the dynamic object-relationship model for each object may perform the steps 602 to 618 described above.

Optionally the system 100 may determine an object sequence 144 for migrating objects in the first database 182 to a second database 184 based on relationships expressed in the dynamic object-relationship model 142. For example, the system 100 may determine an object sequence 144 that preserves the attributes of the objects after migration of objects from the first database 182 to the second database 184. In an example, the system 100 may migrate objects from the first database 182 to the second database 184.

In an example, the system 100 may be used for delta migration. Delta migration may refer to migration of the objects from the first database 182 to the second database 184 over a period of time. In an example, the first database 182 may continue to be used and may change while the objects are migrated from the first database 182 to the second database 184. The system 100 may after migration of objects from the first database 182 to the second database 184 during delta migration, update the dynamic object-relationship model 142 for new objects added to the first database 182 after the dynamic object-relationship model 142 is determined. In an example, the system 100 may determine a sequence for the migration of the new objects. In an example, the sequence of migration of the new objects may include deleting some old objects and/or updating the attributes of some old objects. The system 100 may then migrate the new objects from the first database 182 to the second database 184.

In an example, the system 100 may determine whether the object attributes of objects after migration in the second database are the same as those in the first database. The system 100 may be based on the object attributes of objects after migration in the second database are the same as those in the first database switch the production database from the first database 182 to the second database 184. A production database may be a database that is currently used to store or modify objects.

In an example, the first database 182 and the second database 184 may belong to a customer relationship management database and the migration may take place between two installations of the same customer relationship management database or application. In another example, the first database 182 and the second database 184 may belong to a first customer relationship management database and a second customer relationship management database respectively. In an example, the first database 182 and/or the second database 184 may be on a cloud service that allows objects to be stored.

In an example, the system 100 may determine whether the child object is a standard object. Based on the determination that the child object is not a standard object the system 100 may then determine the child object attributes. In an example, the system 100 may not migrate standard objects that may be created during installation of the first database 182 by an application. In another example, the system 100 may determine changes to the standard objects to determine the customized objects in the first database 182 that may require classification as described above before migration.

Figure 7:
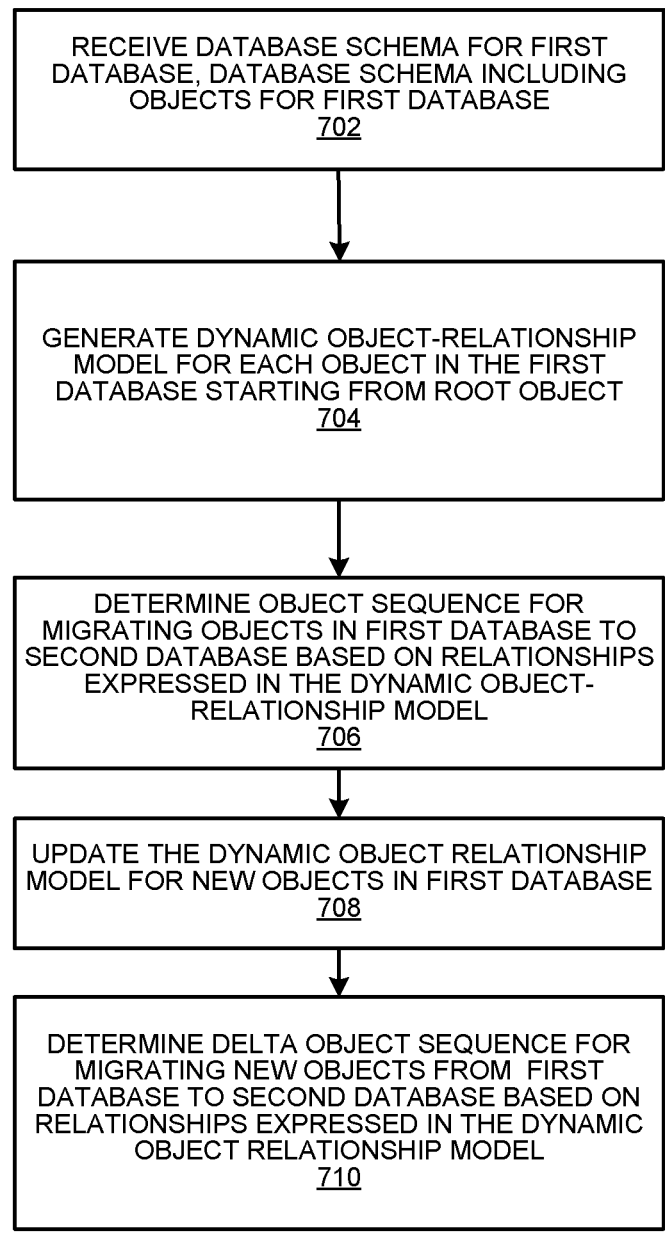
FIG. 7 shows a method for delta migration of a database using the dynamic object-relationship model, according to an example of the present disclosure.

FIG. 7 shows an example of a method 700 for delta migration of the first database 182 using the dynamic object-relationship model 142. Migration of the first database 182 to the second database 184 with millions of objects may require operation of the first database 182 which may be populated with new objects during migration. The method 700 may be used for delta migration of new objects from the first database 182 to the second database 184.

At 702, the system 100 may receive the database schema 102 for the first database 182. In an example, the database schema 102 may as described with reference to FIG. 1 may be generated using a script file. In another example, the system 100 may receive the database schema 102 from a user.

At 704, the system 100 may generate the dynamic object-relationship model 142 for each object starting from the root object as described above with reference to FIG. 6.

At 706, the system 100 may determine an object sequence 144 for migrating objects in the first database 182 to the second database 184 based on relationships expressed in the dynamic object-relationship model 142.

At 708, the system 100 may update the dynamic object-relationship model 142 for new objects in the first database 182. For example, the first database object may continue to be operated and may add new objects during the migration of objects from the first database 182 to the second database 184. The system 100 may determine the new objects added to the first database 182 and determine the object attributes as described above with reference to FIG. 6 to update the dynamic object-relationship model 142.

At 710, the system 100 may determine a delta object sequence for migrating new objects from the first database 182 to the second database 184 based on relationships expressed in the updated dynamic object-relationship model 142. In an example, the system 100 may determine the delta object sequence to prevent missing objects and object attributes in the second database 184.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A database migration system comprising:
   at least one processor to execute machine readable instructions stored on at least one non-transitory computer readable medium, wherein the machine readable instructions are executable by the at least one processor to:
   receive a database schema for a first database, the database schema including objects in the first database;
   generate a dynamic object-relationship model for each object in the first database starting from a root object, wherein to generate the dynamic object-relationship model for each object, the at least one processor is to:
   determine an object attribute of a child object in the first database based on the database schema;
   determine whether the object attribute of the child object is a reference to another object in the first database;
   in response to determining the object attribute of the child object is the reference to the another object,
      determine whether the object attribute of the child object is editable or creatable, including determining if the object attribute of the child object refers to data outside of the child object;
      based on a determination that the object attribute of the child object is editable or creatable, determine whether the object attribute of the child object references itself;
         classify the child object as a self-related object when the child object references itself, or as a direct cross-related object when the child object does not reference itself;
      based on a determination that the object attribute of the child object is non-editable or non-creatable, wherein the object attribute of the child object is non-editable or non-creatable if the object attribute of the child object denotes a parent-child relationship, determine whether the child object is a foreign key of another object;
         classify the child object as an indirect cross-related object when the child object is a foreign key, and classify the child object as a parent-child related object when the child object is not a foreign key; and
   determine an object sequence for migrating the objects in the first database to a second database according to the dynamic object-relationship model, including prioritizing parents in an identified parent-child relationship followed by siblings of the child object in the identified parent-child relationship.

2. The database migration system of claim 1, wherein the machine readable instructions further comprise instructions executable by the at least one processor to:
   migrate the objects in the first database to the second database according to the object sequence.

3. The database migration system of claim 2, wherein the machine readable instructions further comprise instructions executable by the at least one processor to:
   update the dynamic object-relationship model for new objects added to the first database after the dynamic object-relationship model is determined;
   determine a sequence of migration for the new objects; and
   migrate the new objects from the first database to the second database according to the sequence of migration for the new objects.

4. The database migration system of claim 2, wherein the machine readable instructions further comprise instructions executable by the at least one processor to:
   determine whether object attributes of the objects after migration in the second database are the same as those in the first database; and
   based on the object attributes of the objects after migration in the second database being the same as those in the first database, switch from the first database to the second database for a production database.

5. The database migration system of claim 1, wherein the first database and the second database belong to a same customer relationship management application.

6. The database migration system of claim 1, wherein the first database and the second database belong to different customer relationship management applications.

7. The database migration system of claim 1, wherein the database schema represents objects on a cloud service.

8. A database migration system comprising:
   at least one processor to execute machine readable instructions stored on at least one non-transitory computer readable medium, wherein the machine readable instructions are executable by the at least one processor to:
   receive a database schema for a first database, the database schema including objects in the first database;
   generate a dynamic object-relationship model for the first database for each object starting from a root object;
   determine an object sequence for migrating the objects in the first database to a second database based on relationships expressed in the dynamic object-relationship model, including prioritizing parents in an identified parent-child relationship followed by siblings of a child object in the identified parent-child relationship;
   update the dynamic object-relationship model for new objects in the first database; and
   determine a delta object sequence for migrating the objects in the first database to the second database according to the dynamic object-relationship model.

9. The database migration system of claim 8, wherein to generate the dynamic object-relationship model for the first database for each object starting from the root object, the instructions are executable by the at least one processor to:
   determine whether a child object of the root object is a standard object;

based on a determination that the child object of the root object is not a standard object, determine the object attribute of the child object of the root object; and classify the child object of the root object based on the determined object attribute.

10. The database migration system of claim 8, wherein the first database and the second database belong to the same customer relationship management application.

11. The database migration system of claim 8, wherein the first database and the second database belong to different customer relationship management applications.

12. The database migration system of claim 8, wherein the database schema represents objects on a cloud service.

13. The database migration system of claim 8, wherein the machine readable instructions further comprise instructions executable by the at least one processor to:

migrate the objects in the first database to the second database according to the object sequence.

14. A method for migrating objects from a first database to a second database, the method comprising:

determining an object attribute of a child object based on a database schema;

determine whether the object attribute of the child object is a reference to another object in the first database;

determining whether the object attribute of the child object is editable or creatable including determining if the object attribute of the child object refers to data outside of the child object;

based on the determination that the object attribute of the child object is editable or creatable, determining whether the child object references itself;

classifying the child object as a self-related object when the child object references itself or classifying the child object as a direct cross-related object when the child object does not reference itself;

based on the determination that the object attribute of the child object is non-editable or non-creatable, wherein the object attribute of the child object is non-editable or non-creatable if the object attribute of the child object denotes a parent-child relationship, determining whether the child object is a foreign key of another object;

classifying the child object as an indirect cross-related object when the child object is a foreign key or classifying the child object as a parent-child related object when the child object is not a foreign key;

generating a dynamic object-relationship model for the first database for each object in the database schema starting from a root object; and determining an object sequence for migrating the objects from the first database to a second database according to the dynamic object-relationship model.

15. The method of claim 14, wherein determining the object sequence comprises determining the object sequence based on relationships expressed in the dynamic object-relationship model.

16. The method of claim 14, wherein the first database and the second database belong to the same customer relationship management application.

17. The method of claim 14, wherein the first database and the second database belong to different customer relationship management applications.

18. The method of claim 14, wherein the database schema represents objects on a cloud service.

19. The method of claim 14, comprising:

updating the dynamic object-relationship model for new objects added to the first database after the dynamic object-relationship model is determined;

determining a sequence of migration for the new objects; and migrating the new objects from the first database to the second database.

20. The method of claim 14, comprising:

determining whether object attributes of objects from the first database after migration in the second database are the same as those in the first database; and based on the determining whether the object attributes of objects from the first database after migration in the second database are the same as those in the first database, switching from the first database to the second database for a production database.

* * * * *